United States Patent [19]
Mitchell et al.

[11] Patent Number: 5,375,871
[45] Date of Patent: Dec. 27, 1994

[54] VEHICLE SUSPENSION SYSTEM COMPRISING A WIDE BASE BEAM AND AXLE SHELL

[75] Inventors: James L. Mitchell; Jason M. Klein, both of Springfield, Mo.

[73] Assignee: Ridewell Corporation, Springfield, Mo.

[21] Appl. No.: 86,683

[22] Filed: Jul. 2, 1993

[51] Int. Cl.⁵ .................. B60G 11/28; B60G 7/00
[52] U.S. Cl. ........................ 280/688; 280/713
[58] Field of Search ........... 280/713, 711, 725, 724, 280/688; 267/256, 248, 228

[56] References Cited
U.S. PATENT DOCUMENTS

| | | |
|---|---|---|
| 3,510,149 | 5/1970 | Raidel . |
| 3,707,298 | 12/1972 | Henry et al. .............. 267/256 X |
| 4,261,597 | 4/1981 | VanDenberg .............. 280/711 |
| 4,334,696 | 6/1982 | Bergstrom ................. 280/725 |
| 4,465,298 | 8/1984 | Raidel, Sr. ................ 280/713 X |
| 4,566,719 | 1/1986 | VanDenberg .............. 280/711 |
| 4,722,549 | 2/1988 | Raidel ..................... 280/688 |
| 4,741,553 | 5/1988 | Raidel, II ................. 280/682 |
| 4,762,337 | 8/1988 | Raidel ..................... 280/688 |
| 4,902,035 | 2/1990 | Raidel ..................... 280/713 |
| 4,911,417 | 3/1990 | Short ....................... 267/256 |
| 4,991,868 | 2/1991 | Van Denberg ............. 280/711 |
| 5,002,305 | 3/1991 | Raidel ..................... 280/713 |
| 5,013,063 | 5/1991 | Mitchell .................. 280/711 |
| 5,037,126 | 8/1991 | Gottschalk et al. ....... 280/713 X |
| 5,112,078 | 5/1992 | Galazin et al. ........... 280/711 |
| 5,127,668 | 7/1992 | Raidel ..................... 280/711 |

*Primary Examiner*—Eric D. Culbreth
*Assistant Examiner*—Peter C. English
*Attorney, Agent, or Firm*—Rogers, Howell & Haferkamp

[57] ABSTRACT

A vehicle suspension system comprises a beam mounted for pivoting movement to a hanger and securely to a vehicle axle where the beam is constructed with a laterally widening base as it extends longitudinally from the pivot mounting to the vehicle axle and with an axle shell securing the beam to the axle where the shell connection to the axle reduces stress on the vehicle axle.

37 Claims, 3 Drawing Sheets

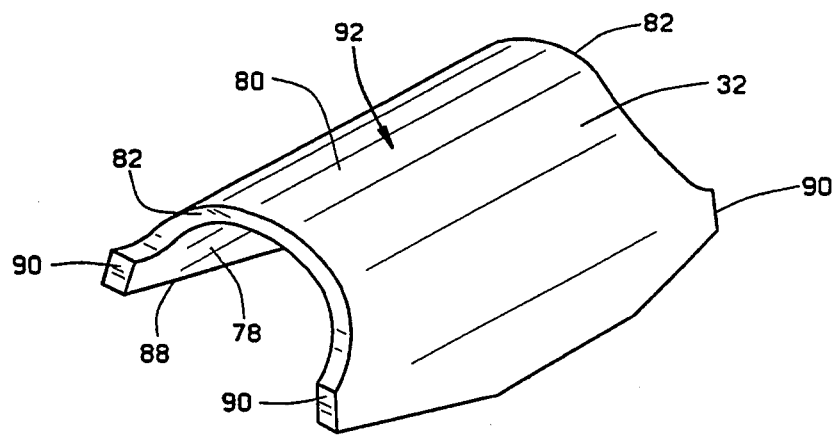
FIG. 3
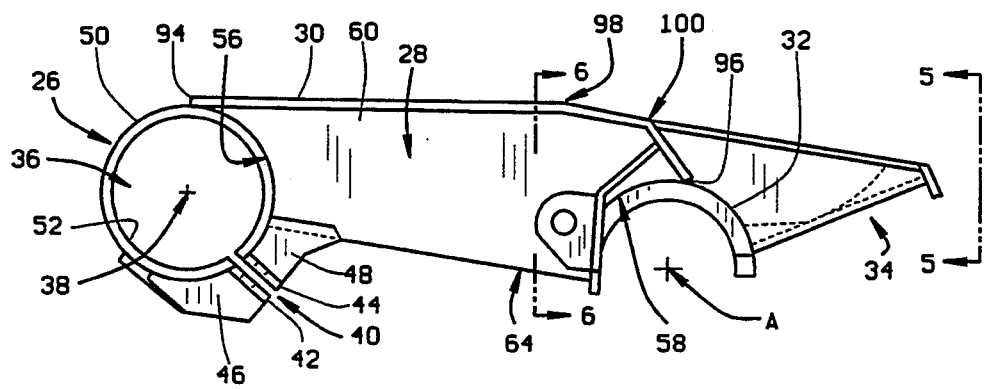
FIG. 4
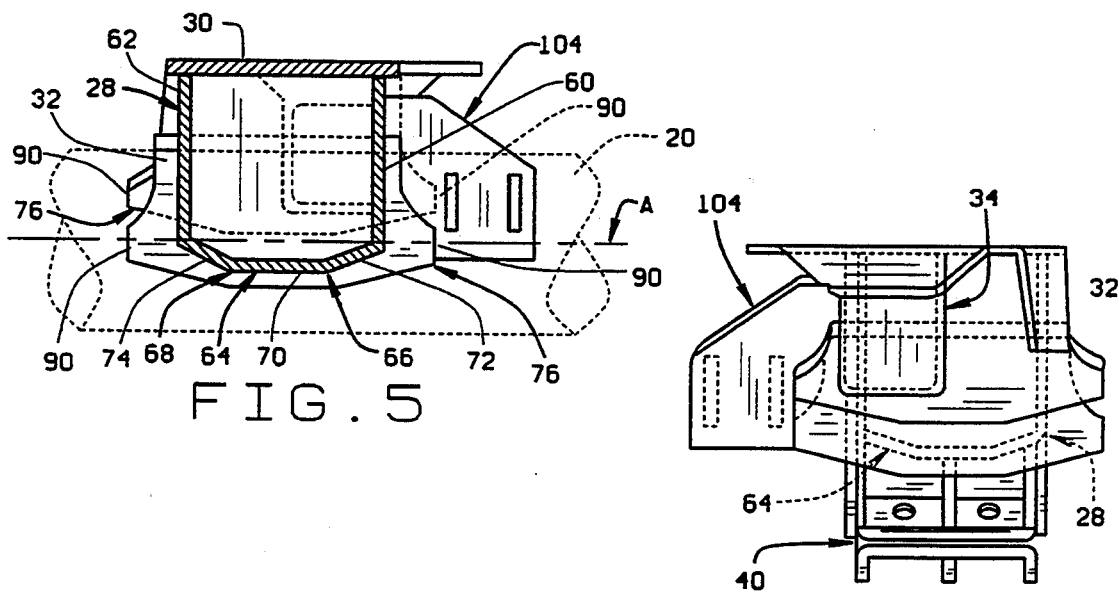
FIG. 5
FIG. 6

VEHICLE SUSPENSION SYSTEM COMPRISING A WIDE BASE BEAM AND AXLE SHELL

BACKGROUND OF THE INVENTION (1) Field of the Invention

The present invention provides a vehicle suspension system employing a beam mounted for pivoting movement to a hanger and connected securely to a vehicle axle where the beam is constructed with a laterally widening base as it extends longitudinally from the pivot mounting to the vehicle axle and with an axle shell securing the beam to the axle where the shell connection to the axle reduces stress on the vehicle axle.

(2) Description of the Related Art

In the design of vehicle suspension system beams of the type having a pivot mounting to a hanger member suspended beneath a vehicle chassis at one end, and a connection to a lateral vehicle axle and a spring means spanning between the beam and the vehicle chassis at an opposite end, it is desirable to reduce the weight of the beam without reducing its capacity to support vehicle loads. With the beam being a major component in most suspension systems, reduction of the beam's weight results in a significant reduction in the overall weight of the suspension system. However, in designing suspension beams to reduce their weight, care must be taken to avoid creating stress concentration areas in the beam itself or in its rigid connection to the vehicle axle. Difficulties are frequently encountered in the design of the connection between the beam and the vehicle axle where stresses are often concentrated. Load stresses due to vehicle load exerted on the beam and cyclic stresses exerted on the beam while the vehicle is operated over the road can be concentrated at the connection of the beam to the axle. Where the connection of the beam to the axle is a rigid, weld connection, the concentration of stresses on the weld can result in the weld's failure, causing the axle to separate from the beam and causing substantial damage to the vehicle.

SUMMARY OF THE INVENTION

The present invention provides a unique beam design of reduced weight with a specialized weld connection to a vehicle axle that reduces stress concentrations and distributes load and cyclic stresses through the construction of the beam, thereby enhancing the fatigue life and safety of the axle attachment to the beam. The reduced weight of the beam reduces the overall weight of the suspension system employing the beam, and thereby reduces the overall weight of the vehicle supported by the suspension system. While the novel construction of the beam minimizes its weight, it also provides a rigid weld connection between the beam and vehicle axle with an extended fatigue life. The construction of the beam may be employed in both an overslung and underslung axle connection with only minor modifications made to the beam to accommodate an air spring connection in both instances.

BRIEF DESCRIPTION OF THE DRAWINGS

Further objects and features of the present invention are revealed in the following detailed description of the preferred embodiment of the invention and in the drawing figures wherein:

FIG. 3 is a perspective view of the axle shell removed from the beam;

FIG. 4 is a side elevation view of the beam shown in FIG. 2;

FIG. 5 is an end elevation view of the beam from the line 5—5 of FIG. 4;

FIG. 6 is a cross section of the beam viewed from the line 6—6 of FIG. 4; and

DESCRIPTION OF THE PREFERRED EMBODIMENT

Figure 1:
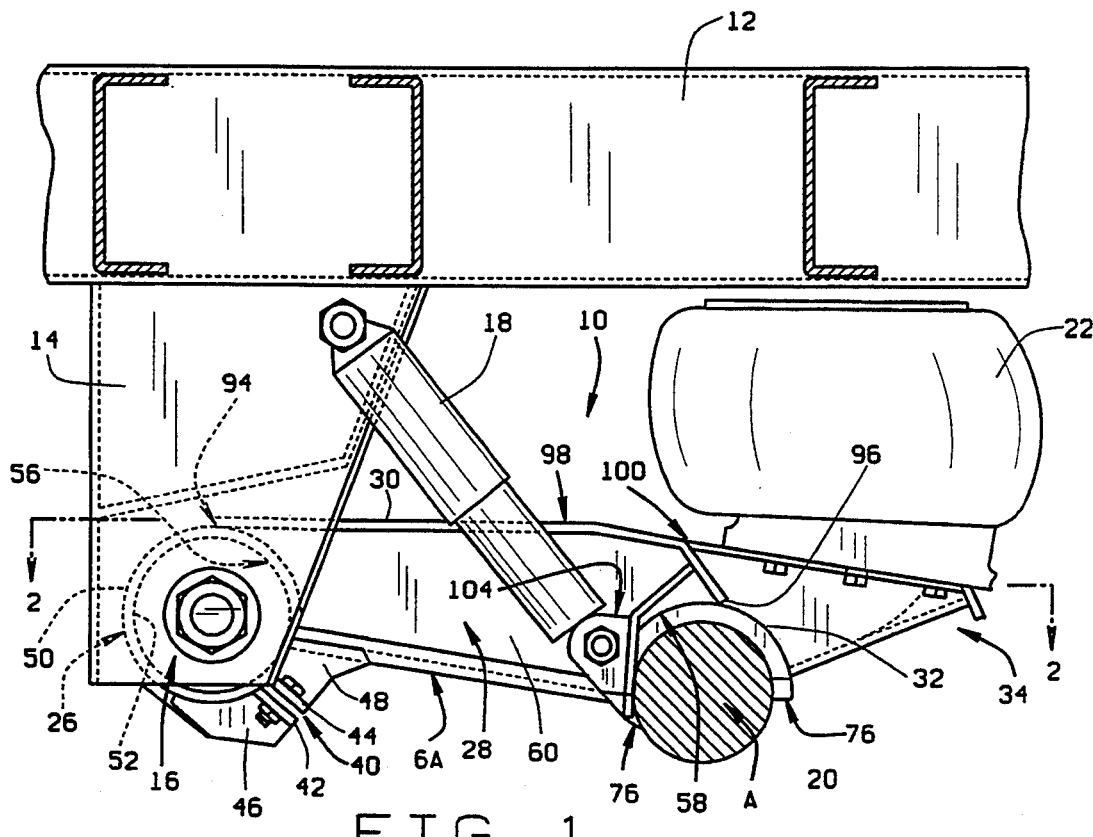
FIG. 1 is a side elevation view of the beam of the present invention in an illustrative operative environment.

FIG. 1 shows one illustration of an operative environment of the suspension system beam 10 of the present invention. It should be understood that the environment shown in FIG. 1 is provided to illustrate only one potential use of the beam 10, and that the beam 10 may be employed in a variety of different types of vehicle suspension systems having constructions differing from that shown in FIG. 1. The suspension system construction shown, apart from the beam 10 of the invention, is for the most part conventional. The system is shown attached to the underside of a vehicle chassis 12 and comprises a hanger 14 supporting a pivot bushing assembly 16, a shock absorber 18, a vehicle axle 20 and an air spring 22 connected between the beam 10 and the underside of the chassis 12. In the operative environment shown, the beam 10 is connected to the axle 20 in an overslung fashion. It should be understood that the beam 10 of the present invention has a construction that may be employed in both overslung and underslung connections to a vehicle axle without substantial modification to the beam itself. With this in mind, the use of terms such as "upward", "downward", "top" and "bottom" in the description of the beam to follow are not intended to have any limiting effect on the claimed subject matter. These terms are used solely to describe the beam in referring to the orientation of the beam shown in the drawing figures. Where the beam of the invention is employed connected to a vehicle axle in an underslung fashion, the terms "upward", "downward", "top" and "bottom" should be interpreted as having their opposite meanings. It is reemphasized that the beam 10 of the present invention in the description to follow is described as being connected to a vehicle axle in an overslung fashion to simplify the description of the invention. The orientational terms employed in the description of the invention and in the claims are not intended to be limiting as the beam 10 of the invention is equally well suited for use in overslung and underslung connections to vehicle axles. In FIG. 1, only one suspension system employing the beam 10 of the invention is shown, it being understood that a like suspension system employing the same beam 10 of the invention is positioned on an opposite lateral side of the vehicle as is conventional.

Figure 2:
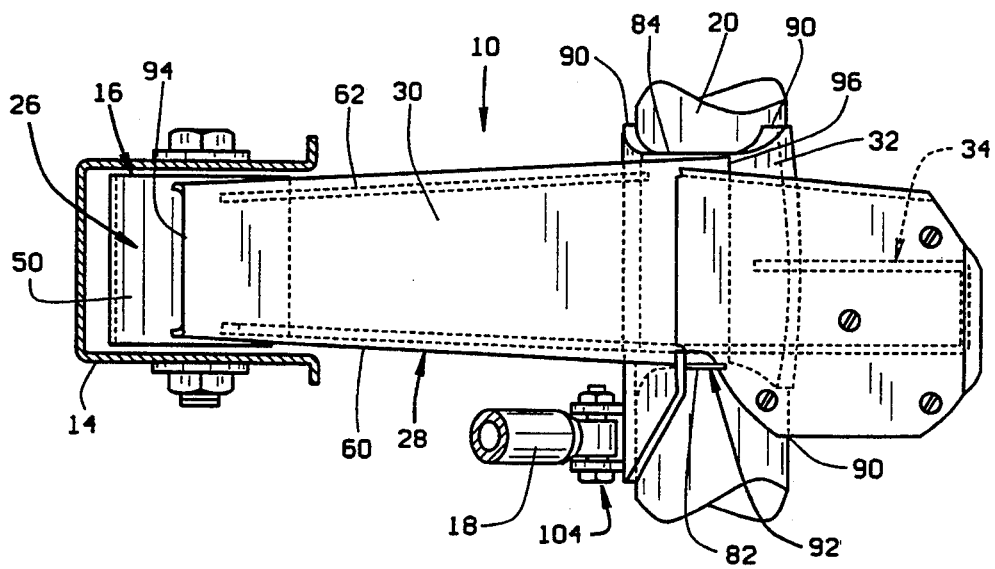
FIG. 2 is a top plan view of the beam shown in FIG. 1 viewed from the line 2—2 of FIG. 1.

FIG. 2 shows the beam 10 removed from the suspension system of FIG. 1 to better illustrate the novel construction of the beam. Generally, the beam is constructed of a generally cylindrical sleeve 26, a U-shaped channel 28, a top panel 30 and a curved axle shell 32.

Also shown in FIG. 1 is an air spring support bracket 34, the configuration of which changes depending on whether the beam 10 is employed in an overslung or underslung attachment to the vehicle axle. As set forth earlier, the bracket 34 shown in FIG. 2 is for use of the beam 10 in an overslung attachment to a vehicle axle.

The cylindrical sleeve 26 is configured to receive a conventional pivot bushing assembly within a center bore 36 of the sleeve having a lateral center axis 38. The sleeve is described as being generally cylindrical herein because the sleeve itself is not a complete cylinder but has a gap 40 formed therethrough. The gap 40 is provided to enable the sleeve to be deformed and enlarged to facilitate the insertion of the pivot bushing assembly into the sleeve center bore 36. A pair of opposed flanges 42, 44 project radially from the opposite sides of the gap 40 and extend laterally across the exterior surface of the sleeve. The flanges 42, 44 are reinforced by pluralities of gussets 46, 48, respectively, secured between the flanges and the exterior surface 50 of the sleeve. A plurality of holes are provided through the flanges 42, 44 for receipt of threaded fasteners that are tightened down to close the sleeve 26 around the pivot bushing providing a secure connection between the sleeve interior surface 52 and the exterior surface of a pivot bushing in attaching the beam 10 to a pivot bushing assembly suspended by a hanger 14 from a vehicle chassis.

Variations of the generally cylindrical sleeve 26 may be employed with the beam 10 without departing from the intended scope of the invention as defined by the claims. For example, the sleeve may be provided in two semicircular sections that are connected together over a pivot bushing assembly by threaded fasteners, thereby attaching the beam to the pivot bushing. Other types of generally cylindrical sleeves providing an attachment of a suspension system beam to a pivot bushing assembly are known in the prior art and it is intended herein that the description of the generally cylindrical sleeve 26 should also cover other known sleeve constructions apart from that shown in the drawings.

The channel 28 has longitudinally opposite first 56 and second 58 ends with a longitudinal length of the channel extending therebetween. The channel 28 has a generally U-shaped cross section comprised of a pair of laterally spaced side panels 60, 62 integrally connected to a bottom panel 64. The lateral spacing of the side panels 60, 62 provides an opening at the top of the channel. The first end 56 of the channel is formed by arcuate configurations of the left hand ends of the side panels 60, 62 and a substantially straight left hand end of the bottom panel 64, all of which fit flush against the sleeve exterior surface 50 and are welded thereto. The reinforcing sleeve gussets 48 are also welded to the bottom panel 64. As the side panels 60, 62 of the channel extend longitudinally from the first end 56 of the channel to the second end 58 they increase vertically in size. The additional material in the area of the channel second end 58 provides additional strength to the channel side panels 60, 62 adjacent their connection to the vehicle axle yet to be described. As the bottom panel 64 of the channel extends longitudinally from the channel first end 56 to the second end 58 it also increases in its lateral width. The increased lateral width of the channel bottom panel 64 at the channel second end 58 over the width of the bottom panel at the channel first end 56 enhances the strength of the bottom panel adjacent its connection to the vehicle axle yet to be described.

The specific configuration of the bottom panel 64 is also designed to enhance the strength of the bottom panel and thereby enhance the overall strength of the channel 28. As shown in the drawing figures, a pair of laterally spaced, longitudinally extending bends 66, 68 are formed in the bottom panel 64. The bends 66, 68 extend the entire length of the bottom panel between the channel first and second ends 56, 58. The bends divide the bottom panel 64 into three longitudinally extending sections. A center section 70 is oriented at an angle to the lateral side sections 72, 74 on opposite sides of the respective bends 66, 68. The relative angles between the center section 70 and the side sections 72, 74 enhance the strength of the bottom panel 64 over prior art beam bottom panels that are substantially flat along their longitudinal lengths.

The increasing lateral width of the bottom panel 64 as it extends from the channel first end 56 to the channel second end 58 also causes the lateral spacing between the side panels 60, 62 to increase as they extend longitudinally from the channel first end 56 to the channel second end 58. The increased lateral spacing between the channel side panels 60, 62 at the channel second end 58 over the lateral spacing between the side panels at the channel first end 56 provides a stronger and more stable connection of the beam to the vehicle axle as will be described.

The axle shell 32 of the beam 10 is specifically designed to minimize stress concentrations in the beam connection to a vehicle axle. The shell 32 is constructed having a generally curved configuration with opposite interior 78 and exterior 80 surfaces, the configuration being bounded by laterally opposite lateral edges 82, 84 of the shell and longitudinally opposite weld edges 86, 88 of the shell. Each of the shell lateral edges 82, 84 flare laterally outward as they extend longitudinally toward the weld edges 86, 88 at the opposite longitudinal ends of the shell. At the junctures of the lateral edges 82, 84 with the weld edges 86, 88 blunt ends 90 are formed to avoid stress concentrations at the juncture of the lateral and weld edges. The projecting tips formed at the blunt ends 90 of the axle shell are more flexible than the remaining construction of the shell and their flexibility distributes stress away from the tips and up the lateral sides of the shell.

Each of the weld edges 86, 88 are given nonlinear configurations. What is meant by nonlinear is that the weld edges 86, 88 are configured to be nonparallel to the axis A of the lateral vehicle axle 20 to which the axle shell 32 is to be joined. The weld edges 86, 88 and welds 76 may have a convex configuration with a continuous curved edge between the blunt ends 90, or a more angular configuration such as that shown in the drawing figures where opposite end portions of the weld edges taper upward toward the blunt ends 90 from an intermediate portion of the weld edges. It should be understood that by describing the weld edges 86, 88 as being nonparallel to the axis of the vehicle lateral axle, various nonlinear configurations of the weld edges similar to the generally convex configuration of the weld edges shown in the drawing figures are intended to be included. Together, the concave configuration of the axle shell lateral edges 82, 84 extending laterally outward beyond the lateral spacing of the beam side panel 60, 62, the blunt ends 90 formed at the junctures of the lateral edges 82, 84 to the opposite ends of the weld edges 86, 88, and the nonparallel, convex configuration of the weld edges 86, 88 all contribute to reducing stress concentrations in the axle shell 32 and the vehicle axle connected to the shell, and in the distribution of vehicle load stresses and operation cyclic stresses throughout the construction of the axle shell 32 and the beam 10.

Although the axle shell 32 is described as having a generally curved configuration and is shown configured to receive a vehicle axle 20 having a circular cross section, it should be understood that the configuration of the shell 32 may be modified to accommodate the receipt of a vehicle axle having a rectangular or other geometric cross section within the curvature of the interior surface 78.

The channel side panels 60, 62 at the second end of the channel 58 are given curved configurations complementary to the curvature of the shell exterior surface 80. The axle shell 32 is connected to the channel second end 58 by welds along the curved configurations of the side panels 60, 62 at the channel second end 58 and along the bottom panel 64 at the channel second end 58. In assembling the beam 10 to a vehicle axle 20, the axle 20 is received within the curvature defined by the shell interior surface 78 and welds 76 between the axle shell 32 and the vehicle axle 20 are provided solely along the weld edges 86, 88 of the axle shell. The welds 76 extend laterally along the weld edges 86, 88 beyond opposite lateral sides of an intermediate portion 92 of the axle shell. The curved configuration of the axle shell weld edges 86, 88 and the resulting curved configuration of the weld line joining the weld edges 86, 88 to the vehicle axle 20, together with the specific configuration of the axle shell prevents stress concentrations at the blunt ends 90 of the shell and distributes vehicle load stress and operation cyclic stress over the weld lines, thereby enhancing the fatigue life and safety of the beam 10.

The top panel 30 has longitudinally opposite first 94 and second 96 ends and a longitudinal length between its opposite ends. The top panel 30 is secured to the top edges of the channel side panels 60, 62 along the entire longitudinal length of these top edges and follows the configuration of the side panel top edges. The first end 94 of the top panel is welded to the exterior surface 50 of the sleeve. A pair of lateral bends 98, 100 are formed in the top panel 30 where it changes its longitudinal direction in following the top edges of the side panels 60, 62. The top panel diverges vertically away from the bottom panel as it extends from the sleeve 26 to the first bend 98. From the first bend 98 to the second bend 100, the top panel extends longitudinally, generally parallel with the channel bottom panel 64. From the second bend 100, the top panel converges toward the channel bottom panel 64 as it extends longitudinally to the top panel second end 96 which is welded to the exterior surface of the axle shell 32. In following the top edges of the channel side panels 60, 62 as they extend from the sleeve 26 to the axle shell 32, the lateral width of the top panel 30 increases. The increased lateral width of the top panel second end 96 over the lateral width of the top panel first end 94 enhances the structural strength of the top panel adjacent its connection to the vehicle axle 20.

A shock absorber bracket 104 is secured to one of the channel side panels 60 by welds. The construction of the bracket 104 is conventional and is not described in detail.

The air spring bracket 34 is secured to the channel second end 58 across the exterior surface of the axle shell 32 and the beam top panel 30. The spring bracket 34 is comprised of a top plate 108 supported by a U-shaped gusset 110 connected between an underside of the top plate 108 and the exterior surfaces of the axle shell 32 and the beam top panel 30. A plurality of holes 112 are provided through the top plate 108 to secure a conventional air spring thereto.

Figure 7:
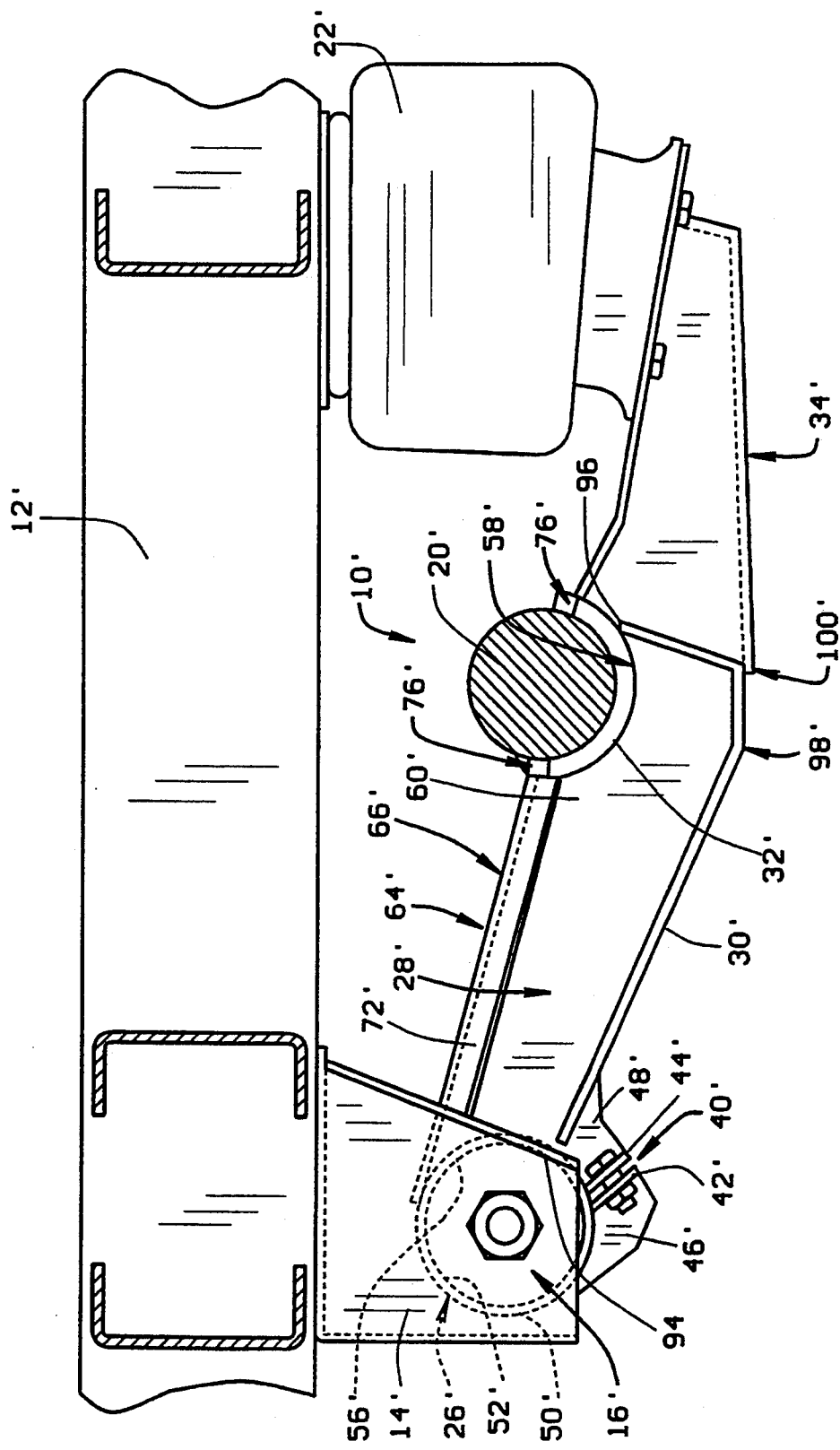
FIG. 7 is a side elevation view of the beam of the invention employed in an underslung attachment to a vehicle axle.

FIG. 7 shows the suspension beam of the present invention in an operative environment where the beam is connected in an underslung fashion to a vehicle axle. The component parts of the beam are substantially identical to the previously described embodiment and are labeled with the same reference numbers as the first described embodiment followed by a prime ('). Apart from slight variations in the shapes of the component parts, the construction of the underslung beam shown in FIG. 7 is substantially identical to that of the first described, overslung embodiment of the beam and will not be described here in detail. It should be understood that the description of the first embodiment of the beam is also applicable to the description of the underslung beam shown in FIG. 7 except that the vertical relative positions of component parts of the beam are reversed. Therefore, the top panel 30 of the first described embodiment is equivalent to the panel 30' of the FIG. 7 embodiment except that it is now positioned on the underside of the beam. The channel 28' of the FIG. 7 beam has an inverted-U shaped configuration with an opening between side panels at the bottom of the beam and with the bottom panel 64' positioned on the upper side of the beam. As stated earlier, in the description of the beam 10 of the invention presented herein and in the subject matter of the invention set forth in the claims, the use of the terms "upward", "downward", "top" and "bottom" were employed only to simplify the description of the beam construction and are not intended to be limiting. As shown in the drawing figures, substantially the same construction of the beam 10 of the invention may be employed in an overslung or underslung manner without departing from the intended scope of the subject matter set forth in the claims.

While the present invention has been described by reference to a specific embodiment, it should be understood that modifications and variations of the invention may be constructed without departing from the scope of the invention defined in the following claims.

What is claimed is:

1. A suspension system beam comprising:
   a generally cylindrical sleeve having a center bore with a generally lateral center axis through the center bore;
   a U-shaped channel having a pair of laterally spaced side panels and a bottom panel connected to and spanning laterally between bottoms of the pair of side panels, the pair of side panels and the bottom panel are formed integrally with each other from a single sheet of metal with the pair of side panels being bent at an angle relative to the bottom panel thereby forming the U-shaped channel, the side panels having top edges and the channel being open between the side panel top edges, and the pair of side panels and the bottom panel each having longitudinally opposite first and second ends, the first ends of the pair of side panels and the bottom panel all being attached to the sleeve; and,
   means for receiving and attaching to a vehicle axle, the second ends of the pair of side panels and the bottom panel all being attached to the means for receiving and attaching to a vehicle axle.

2. The suspension system beam of claim 1, wherein:

the means for receiving and attaching to a vehicle axle is an axle shell formed from a single sheet of metal in a curved configuration with opposite interior and exterior surfaces, the interior surface being configured to extend over a lateral vehicle axle and the exterior surface spanning laterally between the laterally spaced side panels and being attached to the second ends of the pair of side panels and the bottom panel.

3. The suspension system beam of claim 2, wherein: the side panels diverge laterally from each other as they extend longitudinally from the sleeve to the axle shell, whereby the side panels are spaced a first lateral distance from each other at the sleeve and the side panels are spaced a second lateral distance from each other at the axle shell, the second lateral distance being greater than the first lateral distance.

4. The suspension system beam of claim 2, wherein: the bottom panel has a lateral width that increases as the bottom panel extends longitudinally from the sleeve to the axle shell, whereby the bottom panel has a first lateral width at its connection to the sleeve, and the bottom panel has a second lateral width at its connection to the axle shell, the second lateral width being greater than the first lateral width.

5. The suspension system beam of claim 4, wherein: the bottom panel has at least one longitudinally extending bend formed therein separating the bottom panel into at least two longitudinally extending sections where the two longitudinally extending sections are oriented at an angle to each other on opposite sides of the longitudinal bend.

6. The suspension system beam of claim 2, wherein: the axle shell has a semicircular configuration and a lateral length that projects the axle shell laterally beyond the spaced side panels of the channel.

7. The suspension system beam of claim 2, wherein: a top panel is connected over the opening of the channel, the top panel has longitudinally opposite first and second ends with the first end being attached to the sleeve and the second end being attached to the exterior surface of the axle shell.

8. The suspension system beam of claim 7, wherein: the top panel is connected to the top edges of the side panels.

9. The suspension system beam of claim 1, wherein: a top panel is connected over the opening of the channel, the top panel has longitudinally opposite first and second ends with the first end being attached to the sleeve, and the means for receiving and attaching to a vehicle axle is also attached to the second end of the top panel.

10. The suspension system beam of claim 9, wherein: the top panel diverges vertically away from the bottom panel as the top panel extends longitudinally from the sleeve toward the second end of the top panel.

11. The suspension system of claim 9, wherein: an air spring bracket is secured to the top plate and the exterior surface of the axle shell.

12. A suspension system beam comprising:
a generally cylindrical sleeve having a center bore with a generally lateral center axis through the center bore;
a pair of laterally spaced side panels, each side panel having opposite first and second ends and a longitudinal length between its opposite first and second ends, the first end of each side panel being attached to the sleeve and the second end of each side panel having means thereon for connecting the second end to a lateral vehicle axle, the means for connecting the side panel second ends to a vehicle axle includes an axle shell formed from a single sheet of metal in a semicircular curved configuration with opposite interior and exterior surfaces, the interior surface being configured to extend over a lateral vehicle axle and the exterior surface spanning laterally between the laterally spaced side panels and being attached to the second ends of the pair of side panels and the pair of side panels diverging laterally from each other as they extend longitudinally from the sleeve to their second ends, whereby the side panel second ends are spaced a greater lateral distance from each other than are the side panel first ends.

13. The suspension system beam of claim 12, wherein: the axle shell has a lateral length that projects the axle shell laterally beyond the spaced side panels.

14. The suspension system beam of claim 12, wherein: the side panels have top edges and bottoms interconnected by a bottom panel that spans laterally between the side panels, the bottom panel has longitudinally opposite first and second ends with the bottom panel first end being connected to the sleeve and the bottom panel second end connected to the axle shell, and together the pair of side panels and the bottom panel form a U-shaped channel.

15. The suspension system beam of claim 14, wherein: the bottom panel has at least one longitudinally extending bend formed therein separating the bottom panel into at least two longitudinally extending sections where the two longitudinally extending sections are oriented at an angle to each other on opposite sides of the longitudinal bend.

16. The suspension system beam of claim 14, wherein: a top panel is connected over the top edges of the pair of side panels, the top panel has longitudinally opposite first and second ends with the first end of the top panel being connected to the sleeve and the second end of the top panel being connected to the axle shell.

17. The suspension system beam of claim 16, wherein: the top panel diverges vertically away from the bottom panel as the top panel extends longitudinally from the sleeve to the axle shell.

18. A suspension system beam comprising:
a generally cylindrical sleeve having a center bore with a generally lateral center axis through the center bore;
a pair of laterally spaced side panels, each side panel having opposite first and second ends and a longitudinal length between its opposite first and second ends, the first end of each side panel being attached to the sleeve;
a bottom panel having opposite first and second ends and a longitudinal length between its opposite first and second ends, the first end of the bottom panel being attached to the sleeve, the bottom panel having at least one longitudinally extending bend formed therein dividing the bottom panel into at least two sections extending longitudinally between the bottom panel first and second ends, the two sections being positioned at an angle to each other on opposite lateral sides of the bend; and, means for receiving a vehicle axle being provided at the second ends of the pair of side panels and the bottom panel.

19. The suspension system beam of claim 18, wherein:
the bottom panel has a pair of laterally spaced, longitudinally extending bends formed therein dividing the bottom panel into a center section extending longitudinally between the bottom panel first and second ends and a pair of lateral sections each on an opposite lateral side of the center section and each positioned at an angle relative to the center section, the pair of lateral sections extending longitudinally between the bottom panel first and second ends.

20. The suspension system beam of claim 19, wherein:
the means for receiving a vehicle axle is an axle shell having a curved configuration with opposite interior and exterior surfaces, the interior surface being configured to extend over a lateral vehicle axle and the exterior surface being connected to the second ends of the pair of side panels and the bottom panel.

21. The suspension system beam of claim 20, wherein:
the bottom panel has a lateral width that increases as the bottom panel extends longitudinally from the bottom panel first end to the bottom panel second end, whereby the lateral width of the bottom panel first end connected to the sleeve is smaller than the lateral width of the bottom panel second end connected to the axle shell.

22. The suspension system beam of claim 20, wherein:
the bottom panel is connected to the pair of side panels forming a U-shaped channel with an opening between the side panels, and the side panels diverge laterally away from each other as the side panels extend longitudinally from the sleeve to the axle shell, whereby a lateral spacing between the side panels at the side panels connection to the sleeve is smaller than a lateral spacing between the side panels at the side panels connection to the axle shell.

23. The suspension system beam of claim 22, wherein:
the axle shell has a lateral width that projects the axle shell laterally beyond the pair of side panels.

24. The suspension system beam of claim 20, wherein:
the bottom panel is connected to the pair of side panels forming a U-shaped channel with an opening between the side panels, and a top panel is connected to the pair of side panels covering over the opening between the side panels, the top panel having opposite first and second ends and a longitudinal length between its first and second ends, the first end of the top panel is connected to the sleeve and the second end of the top panel is connected to the axle shell.

25. The suspension system beam of claim 24, wherein:
the top panel diverges vertically away from the bottom panel as the top panel extends longitudinally from the sleeve toward the axle shell.

26. A suspension system beam comprising:
a generally cylindrical sleeve having a center bore with a generally lateral center axis through the center bore;
a bottom panel having opposite first and second ends and a longitudinal length extending between the first and second ends, the first end of the bottom panel being connected to the sleeve;
a top panel vertically spaced from the bottom panel, the top panel having opposite first and second ends and a longitudinal length between its first and second ends, the first end of the top panel being connected to the sleeve;
means for receiving a vehicle axle provided at the second ends of both the bottom panel and the top panel, and the top panel having at least one bend intermediate the first and second ends of the top panel, the top panel having a configuration where the top panel diverges vertically away from the bottom panel as the top panel extends longitudinally from the first end of the top panel toward the one bend, and where the top panel converges toward the bottom panel as the top panel extends longitudinally from the one bend toward the top panel second end.

27. The suspension system beam of claim 26, wherein:
the top panel has a pair of longitudinally spaced bends therein, and the top panel diverges away from the bottom panel as the top panel extends longitudinally from the top panel first end to a first bend of the pair of bends, and the top panel converges toward the bottom panel as the top panel extends longitudinally from a second bend of the pair of bends to the second end of the top panel.

28. The suspension system beam of claim 27, wherein:
the means for receiving a vehicle axle at the second ends of the bottom panel and top panel includes an axle shell having a curved configuration with opposite interior and exterior surfaces, the interior surface being configured to extend over a lateral vehicle axle and the second ends of both the top panel and bottom panel are connected to the axle shell exterior surface.

29. The suspension system beam of claim 28, wherein:
the top panel has a lateral width that increases as the top panel extends longitudinally from the first end of the top panel to the second end of the top panel.

30. A suspension system beam comprising:
a generally cylindrical sleeve having a center bore with a generally lateral center axis through the center bore;
an axle shell formed from a single sheet of metal in a curved configuration with opposite interior and exterior surfaces, the interior surface being configured to extend over a lateral vehicle axle;
at least one panel having longitudinally opposite first and second ends and a longitudinal length between its opposite first and second ends, the first end being welded to the sleeve and the second end being welded to the axle shell exterior surface; and,
the axle shell having at least one laterally extending weld edge configured to be positioned against the lateral vehicle axle for being welded thereto, at least a portion of the weld edge being nonparallel to a lateral center axis of the axle.

31. The suspension system beam of claim 30, wherein:
the axle shell has a pair of longitudinally spaced, laterally extending weld edges configured to be positioned against opposite sides of the vehicle axle for being welded thereto, and at least a portion of both weld edges is nonparallel to a lateral center axis of the axle.

32. The suspension system beam of claim 30, wherein:
the axle shell has a pair of laterally spaced side edges and a pair of longitudinally spaced weld edges, and the pair of weld edges each have a generally convex configuration.

33. The suspension system beam of claim 32, wherein:

the pair of side edges are mirror images of each other and each have a generally concave configuration.

34. The suspension system beam of claim 30, wherein: the weld edge has a convex configuration.

35. The suspension system beam of claim 30, wherein: the axle shell has a pair of laterally spaced side edges that extend longitudinally and join with opposite lateral ends of the weld edge, and the side edges are mirror images of each other and both diverge laterally from each other as they extend longitudinally toward the opposite lateral ends of the weld edge.

36. The suspension system beam of claim 35, wherein: the axle shell side edges are spaced a first lateral distance from each other at an intermediate portion of the axle shell and diverge laterally from the intermediate portion of the axle shell as they extend longitudinally toward the opposite lateral ends of the weld edges where they are spaced a second lateral distance from each other, the second lateral distance being greater than the first lateral distance.

37. The suspension system of claim 30, wherein: a second panel having longitudinally opposite first and second ends and a longitudinal length between its opposite first and second ends is positioned in a mutually opposed relation with the one panel, the second panel first end being welded to the sleeve and the second panel second end being welded to the axle shell exterior surface.

* * * * *